United States Patent [19]
Soliman

[11] Patent Number: 5,596,570
[45] Date of Patent: Jan. 21, 1997

[54] SYSTEM AND METHOD FOR SIMULATING INTERFERENCE RECEIVED BY SUBSCRIBER UNITS IN A SPREAD SPECTRUM COMMUNICATION NETWORK

[75] Inventor: Samir S. Soliman, San Diego, Calif.

[73] Assignee: Qualcomm Incorporated, San Diego, Calif.

[21] Appl. No.: 651,310

[22] Filed: May 22, 1996

Related U.S. Application Data

[63] Continuation of Ser. No. 274,609, Jul. 13, 1994, abandoned.
[51] Int. Cl.$^6$ .................................................. H04J 13/02
[52] U.S. Cl. .................. 370/252; 370/335; 370/203; 379/59; 455/50.1; 455/54.1; 455/67.3; 375/200
[58] Field of Search .................. 370/17, 18, 19, 370/21, 22, 95.3; 455/33.1, 33.4, 50.1, 51.1, 54.1, 56.1, 67.3, 296, 297; 379/58, 59; 375/205, 206, 207, 208, 209, 210, 200

[56] References Cited

U.S. PATENT DOCUMENTS

| | | | |
|---|---|---|---|
| 4,470,138 | 9/1984 | Gutleber | 370/18 |
| 4,901,307 | 2/1990 | Gilhousen et al. | 370/18 |
| 5,103,459 | 4/1992 | Gilhousen et al. | 375/205 |
| 5,136,612 | 8/1992 | Bi | 370/18 X |
| 5,148,548 | 9/1992 | Meche et al. | 455/34.1 |
| 5,325,394 | 6/1994 | Bruckert | 375/200 |
| 5,404,576 | 4/1995 | Yahagi | 455/56.1 |
| 5,410,737 | 4/1995 | Jones | 455/56.1 |

FOREIGN PATENT DOCUMENTS

| | | | |
|---|---|---|---|
| 0044133 | 1/1982 | European Pat. Off. | H04B 17/00 |

OTHER PUBLICATIONS

Brian D. Woerner et al., "Simulation Issues for Future Wireless Modems", *IEEE Communications Magazine*, Jul. 1994, pp. 42–53.

*Primary Examiner*—Douglas W. Olms
*Assistant Examiner*—Russell W. Blum
*Attorney, Agent, or Firm*—Russell B. Miller; Gregory D. Ogrod

[57] ABSTRACT

A method and apparatus for simulating signal interference in one communication channel within a communication system, such as cellular or wireless subscriber telephone and/or data systems. The communication system may be of a cellular type in which users from a plurality of cells communicate information signals between one another using at least one base station and code division multiple access (CDMA) spread spectrum type communication signals. The base station is included in a first of the cells and has a transmitter from which information is transmitted to subscriber units over at least one communication channel. The disclosed method includes the step of determining a first composite signal energy associated with signal transmission from the base station transmitter over a first set of simulated communication channels. The simulation method further contemplates estimating a first average data rate for the first composite signal energy. Signal power transmitted over the one communication channel is adjusted in accordance with a first interference signal which is based on the first composite signal energy and first average data rate. In a preferred implementation, a determination is also made of a second composite signal energy associated with signal transmissions from base station transmitters in other cells over a second set of simulated communication channels. An estimate is also made of a second average data rate for the second composite signal energy to enable generation of a second interference signal.

45 Claims, 6 Drawing Sheets

SYSTEM AND METHOD FOR SIMULATING INTERFERENCE RECEIVED BY SUBSCRIBER UNITS IN A SPREAD SPECTRUM COMMUNICATION NETWORK

This is a Continuation of application Ser. No. 08/274,609, filed Jul. 13, 1994, now abandoned.

BACKGROUND OF THE INVENTION

I. Field of the Invention

This invention relates generally to wireless communication networks such as, for example, cellular wireless local telephone systems and personal communication systems. More specifically, this invention relates to a novel and improved system and method for communicating information, in mobile cellular or satellite telephone systems, using spread spectrum type communication signals.

II. Description of the Related Art

The use of code division multiple access (CDMA) modulation techniques is one of several methods for facilitating communications in systems accommodating a large number of users. Other multiple access communication system techniques, such as time division multiple access (TDMA), frequency division multiple access (FDMA) and AM modulation schemes such as amplitude companded single sideband are known in the art. However, CDMA spread spectrum modulation techniques have significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", and is assigned to the assignee of this invention.

In U.S. Pat. No. 4,901,307 referenced above, a multiple access technique is disclosed where a large number of wireless system users each having a transceiver, communicate through satellite repeaters or terrestrial base station transceivers using CDMA spread spectrum communication signals. In using CDMA communication techniques, the frequency spectrum can be reused multiple times thus permitting an increase in system user capacity. The use of CDMA results in a much higher spectral efficiency than can be achieved using other multiple access techniques.

The CDMA techniques as disclosed in U.S. Pat. No. 4,901,307 contemplate the use of relatively long high speed pseudonoise (PN) sequences with each user channel being assigned a different PN sequence. The cross-correlation between different PN sequences and the autocorrelation of a PN sequence for all time shifts other than zero both have average values close to zero. In this way signals transmitted from a base station over a "forward" communication link are capable of being discriminated between upon reception by remote user or subscriber units.

However, because such PN signals are not completely orthogonal, over brief time intervals mutual interference noise is created between them. This interference noise arises despite the fact that the cross-correlations of the PN signals average to near zero, since for a short time interval, i.e., an information bit length, the cross-correlation follows a binomial distribution. As such, the forward link signals interfere with each other much the same as if they were wide bandwidth Gaussian noise at the same power spectral density. Accordingly, this type of mutual interference among signals transmitted over a forward link tends to limit achievable communication system capacity.

In U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", also assigned to the assignee of this invention, and which is incorporated herein by reference, there is disclosed a novel and improved method and system for constructing PN sequences that provides orthogonality between signals transmitted to subscribers over the forward link so that mutual interference is reduced. Such a reduction in mutual interference allows for higher system capacity and better link performance. Since using orthogonal PN codes make the cross-correlation zero over a predetermined time interval, no mutual interference arises, provided that the code time frames are aligned with each other.

In the system described in the just mentioned patent, a preferred waveform implemented involves using a direct sequence PN spread spectrum carrier. The chip rate of the PN carrier was chosen to be 1.2288 MHz in the preferred embodiment. One consideration involved in the choice of chip rate is that it be exactly divisible by baseband data rates to be used in the communication system. It is also desirable for the chip rate to be a power of two times the baseband data rate. In the preferred embodiment, the baseband data rate is 9600 bits per second, leading to a choice of 1.2288 MHz, which is 128 ($2^7$) times 9600 for the PN chip rate.

In communications occurring between cellular base stations and various mobile units, the code sequences used for spreading the spectrum are constructed from two different types of sequences, each with different properties to provide different functions. There is an outer code that is shared by all signals in a cell or sector that is used to discriminate between multipath signals. The outer code is also used to discriminate between signals transmitted by different cells or sectors to the mobile units. There is also an inner code that is used to discriminate between user signals transmitted within a single sector or cell.

Implementation of a cellular CDMA system capable of providing adequate service to a particular geographic region generally involves consideration of a number of factors bearing upon system performance. For example, it is generally necessary to consider the extent of the available frequency spectrum, as well as the potential for coordination with other nearby communication systems. In addition, constraints imposed by thermal noise and interference generated by the various remote users or subscriber units needs to be taken into consideration. Estimates of interference are of particular concern within CDMA systems, since power is transmitted by the subscriber units over the same bandwidth irrespective of location within the cellular coverage area.

Interference on a forward, i.e., cell-to-subscriber, link can occur when base stations within neighboring cells use the same or an adjacent CDMA communication or radio channel as that intended for reception by a particular subscriber unit. In order to evaluate system performance under realistic conditions, a selected number of subscriber units may be deployed at various distances from multiple base stations as a means of estimating forward link interference levels. However, attempting to determine forward link interference through such field tests requires the availability of many multiple subscriber units and base stations. This would preclude complete system calibration when the number of base stations available during initial system testing was less than the number to eventually be installed.

Accordingly, it is an object of the present invention to provide a system for simulating interference due to signal transmission from base stations to subscriber units within a CDMA communication system.

SUMMARY OF THE INVENTION

In summary, the present invention provides a method and apparatus for simulating signal interference arising within a communication system such as a wireless subscriber telephone and/or data system. The communication system is preferably a type in which remote users or subscribers from a plurality of cells communicate information signals between one another or to public switched telephone networks using at least a one base station and code division multiple access (CDMA) spread spectrum type communication signals. The base station has at least one transmitter from which information is transmitted to subscriber units over at least one communication channel and is located in a first of the cells.

The inventive method for simulating signal interference in the at least one communication channel includes the step of determining a first composite signal energy associated with signal transmission from the base station transmitter over a first set of simulated communication channels. A determination is also made as to a first average data rate for transmission of the first composite signal energy, which can be based on a rate established for various users within the system. Signal power transmitted over the one communication channel is adjusted in accordance with a first interference signal which is provided at a power level determined on the basis of the first composite signal energy and average data rate. The first interference signal is transmitted over the at least one communication channel.

When system users or subscribers are already deployed using channels in the communication system, a determination can be made as to the number of equivalent simulated channels needed by reducing the number of desired simulated channels by the number of real channels already in use. A determination of signal energy transmitted over the equivalent number of channels and associated average data rate are then used to determine the composite signal energy. In addition, the real remote users can be monitored to determine both the number of channels in use and either actual interference or volume of communication traffic.

The present invention also contemplates determining a second composite signal energy for signal transmissions over a second set of simulated channels. A similar determination is made of a second average data rate at which this signal energy is transmitted in the second set of simulated channels. This allows generation of a second interference signal based on the second composite signal energy and average data rate. The second interference signal can be used to modify the first.

The first interference signal represents an orthogonal interference component associated with signal transmission inside the first cell while the second interference signal represents a non-orthogonal interference component associated with signal transmission outside of the first cell. The power of signal energy transmitted over the first communication channel is adjusted in accordance with the orthogonal and non-orthogonal signal energies.

The first interference signal is typically provided by generating a sequence of random variables and then shaping their spectrum by filtering them in accordance with a predetermined correlation function. The sequence of random variables can be scaled based on the first average data rate, and shifted based on a magnitude of the first composite signal energy. In a preferred embodiment this is accomplished by synthesizing electrical noise over a predetermined frequency band, preferably having a relatively uniform spectral density, and then adjusting the energy level of this electrical noise in response to the value of the first composite signal energy and average data rate. The signal energy can also be adjusted in response to the second composite signal energy and average data rate for other simulated channels. The invention further provides a technique for utilizing a random variable sequence, such as a Gaussian random variable, to model variations in the first composite signal.

The apparatus for simulating signal interference between communication channels in the communication system generally has an energy selection element which outputs the first composite signal energy for signals transmitted over the first set of a desired number of simulated channels and a data rate generation element that outputs the first average data rate. A first interference signal generator coupled to the both the energy selector and data rate generator produces an output signal having a signal power based on the first composite signal power and average data rate.

A preferred first interference signal generator uses at least one electrical noise signal generator with an output energy that is adjustable in response to a control signal input. At least one noise intensity controller coupled to the control input of the noise source generator, and itself having inputs coupled to the energy selector and data rate generator, provides a control signal having a value that varies in response to changes in the signal energy and data rate for simulated channels. At least a second energy selector can also be used which outputs a second composite signal energy for signals transmitted by a second set of simulated channels, and the noise intensity controller is configured to also base signal generation in part on the signal power which is transmitted by these other simulated channels.

In one aspect of the invention, the controller has an element for generating a sequence of random variables, and means for scaling this sequence based on the average data rate. The controller also comprises means for shifting the sequence of random variables based on a magnitude of the first composite signal energy. In another aspect of the invention, the noise controller uses binary sequence generators to produce Gaussian random variables at preselected rates and sequence filters connected to receive and filter these binary sequences based on an estimated correlation time of data signals carried by the transmitted signal energy and on an average energy fluctuation. In either case the filtered electronic noise is transferred over said one communication channel.

BRIEF DESCRIPTION OF THE DRAWINGS

Additional purposes, objects and features of the invention will be more readily apparent from the following detailed description and appended claims when taken in conjunction with the drawings, in which:

DETAILED DESCRIPTION OF THE PREFERRED EMBODIMENTS

I. System Overview

In a CDMA cellular telephone system such as is described in U.S. Pat. No. 5,103,459 referenced above, each cell-site or base station has several modulator-demodulator units or spread spectrum modems. Each modem consists of a digital spread spectrum transmit modulator, at least one digital spread spectrum data receiver and a searcher receiver. Each modem at a cell-site is assigned to a subscriber unit as needed to facilitate communication over a forward "traffic channel" with the assigned subscriber unit.

Figure 1:
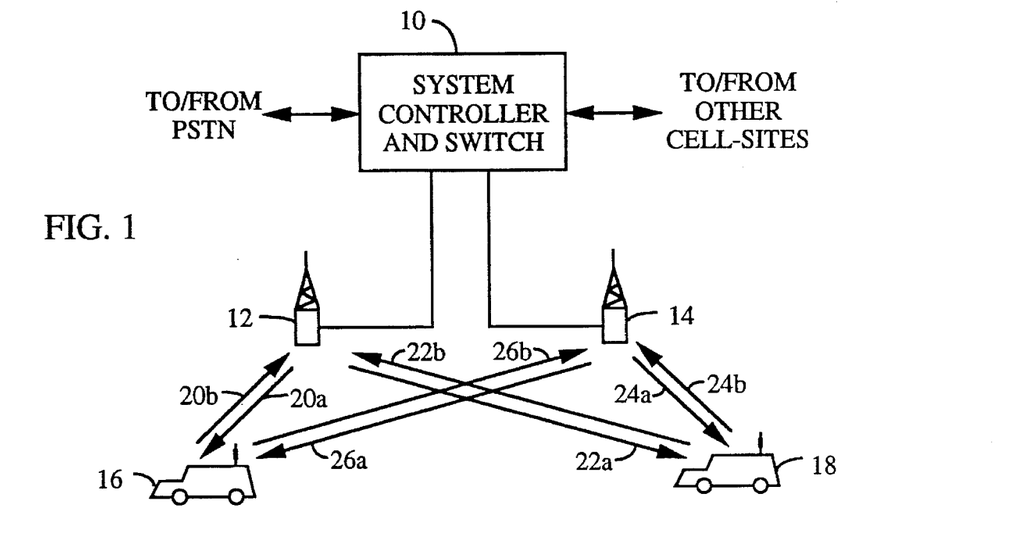
FIG. 1 is a block diagram of an exemplary cellular telephone system which may employ the noise interference simulation system of the present invention.

An exemplary cellular telephone system, in which the noise interference simulation system of the present invention may be integrated is illustrated in FIG. 1. The system illustrated in FIG. 1 utilizes spread spectrum modulation techniques in communication over forward traffic channels between cell-sites and system subscriber units or mobile telephones. Cellular systems in large cities may have hundreds of cell-site base stations serving hundreds of thousands of mobile telephones or other subscriber units. The use of spread spectrum techniques, in particular CDMA, readily facilitates increases in user capacity in systems of this size as compared to conventional FM modulation type cellular systems. Although the present invention is described herein with reference to the mobile cellular system of FIG. 1, it is understood that the teachings of the invention are equally applicable to CDMA communications systems in which a plurality of subscriber units are dispersed over a set of fixed locations.

As described below, the present invention provides a method and apparatus for simulating the effect of signal interference received by a given subscriber unit due to data transmission on traffic channels within its own cell, as well that due to interference from signal transmission on traffic channels in surrounding cells. In accordance with the invention, such traffic channel interference is simulated by injecting random data into the signal transmitted by the cell-site base station located within the cell of a given subscriber unit. This enables simulation of interference arising from signal transmission on a selected number of traffic channels, irrespective of the number of traffic channels:

(i) actually in use within the cell of the given subscriber unit (hereinafter referred to as the "simulated" cell), or (ii) actually being used within cells surrounding the simulated cell. It follows that simulation of interference levels corresponding to maximum cell capacity is possible even if the requisite number of subscriber units are not available.

Although in the preferred embodiment of the invention the simulated traffic channel interference noise is transmitted by the cell-site within the simulated cell, in alternative embodiments an analogous interference signal is directly injected into the receiver of the subscriber unit under test. In the latter instance, the injected signal is formulated so as to account for the effects of propagation over the transmission path between the cell-site and the subscriber unit under test.

Referring to FIG. 1, system controller and switch 10, also referred to as a mobile telephone switching office (MTSO), typically includes interface and processing circuitry for providing system control to the cell-sites. Controller 10 also controls the routing of telephone calls from a public switched telephone network (PSTN) to an appropriate cell-site for transmission to an appropriate mobile or subscriber unit. Controller 10 also controls the routing of calls from the mobile or remote subscriber units, using at least one cell-site, to the PSTN. Controller 10 may connect or link calls between subscriber users using the appropriate base stations since the subscriber units do not typically communicate directly with one another.

Controller 10 may be coupled to the cell-sites by various means such as dedicated telephone lines, optical fiber links, or microwave communication links. In FIG. 1, two such exemplary cell-sites 12 and 14 are shown along with mobile units 16 and 18, where each mobile unit includes a cellular telephone. Exemplary cell-sites 12 and 14, as discussed herein and as illustrated in the drawings, are considered as providing service to an entire cell. However, it should be understood that a cell may be geographically divided into sectors with each sector providing service to a different coverage area. Accordingly, handoffs are generally required to be made between sectors within a cell, while diversity may also be achieved between sectors as is done between cells.

In FIG. 1, lines 20a–20b and 22a–22b, along with their respective arrowheads, correspond to signal transmission, which includes data transmission over various traffic channels, between cell-site 12 and mobile units 16 and 18, respectively. Similarly, lines 24a–24b and 26a–26b represent communication between cell-site 14 and mobile units 18 and 16, respectively. Cell-sites 12 and 14 nominally transmit using equal power.

The coverage of cell-site service areas or cells is designed or laid out in geographic shapes such that the mobile units will normally be closest to one cell-site, and within only one sector if cell is divided into sectors. When the mobile unit is idle, i.e. no calls in progress, the mobile unit constantly monitors pilot signal transmissions from each nearby cell-site, and, if applicable, from a single cell-site if the cell is sectorized. Mobile unit 16 can determine which cell it is in by comparing signal strength for pilot signals transmitted from cell-sites 12 and 14.

In the example illustrated in FIG. 1, mobile unit 16 may be considered closest to cell-site 12. When mobile unit 16 initiates a call, a control message is transmitted to the nearest cell-site, here cell-site 12. Cell-site 12, upon receiving the call request message, transfers the called number to system controller 10. System controller 10 then connects the call through the PSTN to the intended recipient.

Should a call be initiated within the PSTN, controller 10 transmits the call information to all of the cell-sites in the area. The cell-sites in return transmit a paging message within each respective coverage area that is intended for the called recipient mobile user. When the intended recipient mobile unit "hears" or receives the page message, it responds with a control message that is transmitted to the nearest cell-site. This control message signals the system controller that this particular cell-site is in communication with the paged mobile unit. Controller 10 then routes the call through this cell-site to the mobile unit. Should mobile unit 16 move out of the coverage area of the initial cell-site, 12, an attempt is made to continue the call by routing the call through another cell-site.

In the exemplary system of FIG. 1, orthogonal Walsh functions are assigned to user channels on the cell-to-subscriber link. In the case of voice channels, the digital symbol stream for each voice signal is multiplied by its assigned Walsh sequence. The Walsh coded symbol stream for each voice channel is then multiplied by the outer PN coded waveform. The resultant spread symbol streams are then added together to form a composite waveform.

The resulting composite waveform is then modulated onto a sinusoidal carrier, bandpass filtered, translated to the desired operating frequency, amplified and radiated by the antenna system. Alternate embodiments of the present invention may interchange the order of some of the operations just described for forming the cell-site transmitted signal. For example, it may be preferred to multiply each voice channel by the outer PN coded waveform and perform the filter operation prior to summation of all the channel signals which are to be radiated by the antenna. It is well known in the art that the order of linear operations may be interchanged to obtain various implementation advantages and different designs.

The waveform design of the preferred embodiment for cellular service uses the pilot carrier approach for the cell-to-subscriber link, as is described in U.S. Pat. No. 4,901,307. All cells transmit a pilot carrier using the same 32,768 length sequence, but with different timing offsets to prevent mutual interference.

As is described in greater detail below, the symbol stream for a particular cellular user is combined in a first exclusive OR operation with the Walsh sequence assigned to that user. The Walsh function is typically clocked at a rate of 1.2288 MHz, while in an exemplary variable data rate system including voice, facsimile (FAX), and high/low-speed data channels the information symbol rate may vary from approximately 75 Hz to 76,800 Hz. The resulting coded waveform is combined in a second exclusive OR operation with a binary PN sequence also clocked at 1.2288 MHz. An identical binary PN sequence is used to encode each subscriber channel within a particular sector of the coverage area of the cellular system. As a consequence of the orthogonality of the Walsh coding sequences, each sequence may be used to process user data on a single RF channel associated with such a sector without inducing interference among the users within the sector.

Prior to application of Walsh coding, the signals carried by each channel may also be convolutional encoded, with repetition, and interleaved in order to provide error detection and correction functions which allow the system to operate at a much lower signal-to-noise and interference ratio. Techniques for convolutional encoding, repetition, and interleaving are well known in the art. The resulting signals are then generally modulated onto an RF carrier and summed with the pilot and setup carriers, along with the other voice carriers. Summation may be accomplished at several different points in the processing such as at the IF frequency, or at the baseband frequency either before or after multiplication by the PN sequence associated with the channels within a particular cell.

Each voice carrier may also be multiplied by a value that sets its transmitted power relative to the power of the other voice carriers. This power control feature allows power to be allocated to those links that require higher power due to the intended recipient being in a relatively unfavorable location. Means are provided for the subscribers to report their received signal-to-noise ratio to allow the power to be set at a level that provides for adequate performance without wasting power. The orthogonality property of the Walsh functions is not disturbed by using different power levels for the different voice carriers provided that time alignment is maintained.

Figure 2:
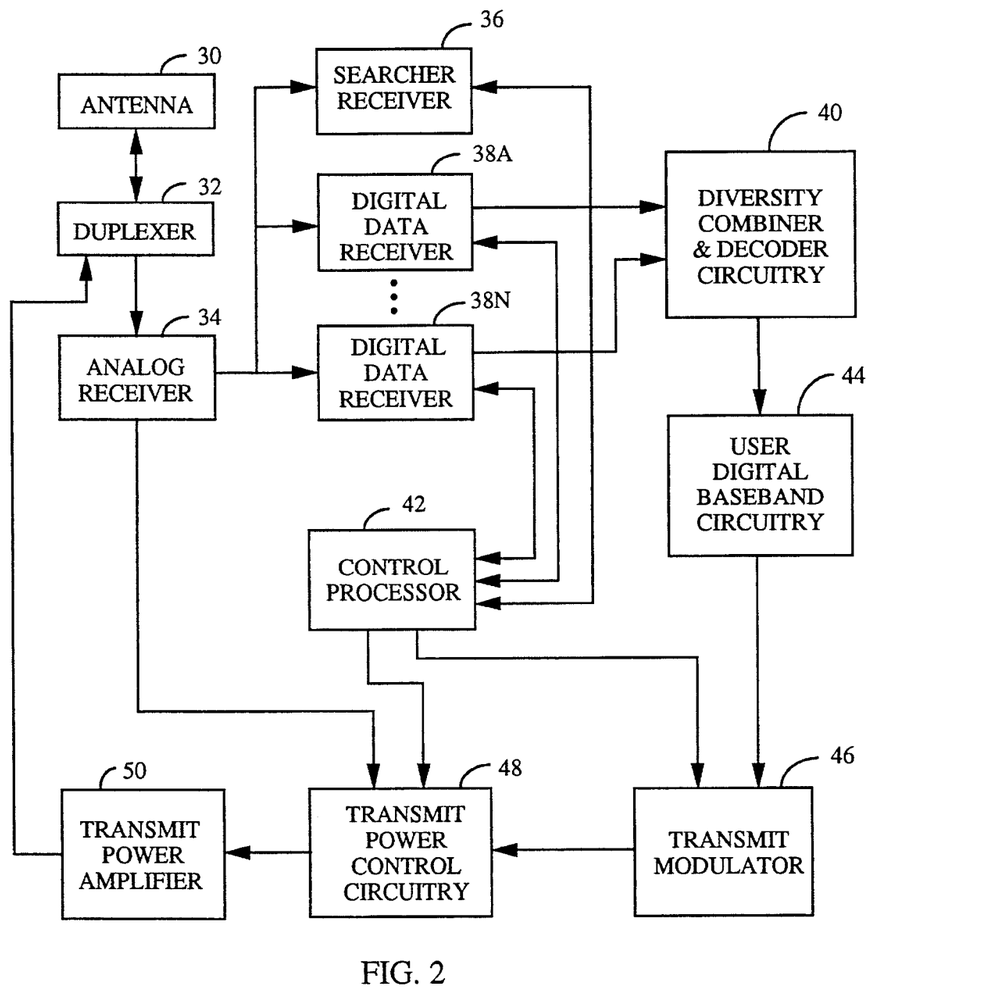
FIG. 2 illustrates a block diagram of an exemplary subscriber unit receiver equipment.

FIG. 2 illustrates, in block diagram form, an exemplary embodiment of a subscriber unit transceiver. The receiver portion of the subscriber unit of FIG. 2 comprises an analog receiver 34, a searcher receiver 36, several RAKE or digital data receivers 38A–38N, and diversity combiner and decoder circuitry 40. The transmitter portion comprises transmit modulator 46, transmit power control circuitry 48, and transmit power amplifier 50. Shared between the receiver portion and the transmitter portion is an antenna 30, a duplexer 32, control processor 42, and user digital baseband circuitry 44.

Control processor 42 is coupled to searcher receiver 36 and data receivers 38A–38N in the receiver portion, and transmit modulator 46 and transmit power control circuitry 48 in the transmitter portion. User digital baseband circuitry 44 performs various functions such as analog-to-digital conversion and digital conversion, along with providing an interface to the subscriber unit microphone and speaker (not shown).

Control processor 42 provides among other operations, functions such as signal processing; timing signal generation; power control; and control over handoff, diversity, and symbol combining. Further details of the operation of such a subscriber unit are provided in U.S. Pat. No. 5,103,459.

II. Overview of Cell-To-Subscriber Link Interference

When receiving a signal from the cell-site transmitter within its own cell, i.e., the simulated cell, the subscriber unit is subjected to interference from cell-to-subscriber links within the simulated cell. In an exemplary CDMA system, this interference includes interference due to transmission over various other traffic channels within the simulated cell, as well as over other pilot, sync or synchronization, and paging channels associated with subscribers within the simulated cell. Since in the exemplary system the signals transmitted over these channels are orthogonal to transmissions over the selected traffic channel under test, this interference is hereafter referred to as the orthogonal interference component. The subscriber unit also experiences interference due to signal transmission over channels in neighboring cells not orthogonal to the traffic channels within the simulated cell. Hence, interference due to signal transmission within surrounding cells is referred to as the non-orthogonal interference component.

The power transmitted over the cell-to-subscriber link within an exemplary CDMA system is shared by pilot, sync, paging, and traffic (i.e., data) channels. The share of power allocated to each channel is varied based on the location of the associated subscriber unit, and in accordance with the aggregate number of subscriber units (i.e., the system load) in the communication system. Power is allocated among traffic channels by a controller within the cell-site transmitter of the simulated cell using digital adjustment of the gain associated with each channel. The gain of each channel within the exemplary system is typically represented by an unsigned 7-bit gain coefficient used to regulate the magnitude of both the in-phase (I) and quadrature phase (Q) channel components.

III. Forward Traffic Channel Interference

The signal interference on the forward traffic, i.e., data, channel of a particular cell-to-subscriber link includes a pair of uncorrelated components: namely, an orthogonal component due to interference noise arising from transmissions to other subscribers within the simulated cell, and a non-orthogonal component due to interference from surrounding cells.

Non-Orthogonal Component

Figure 3A:
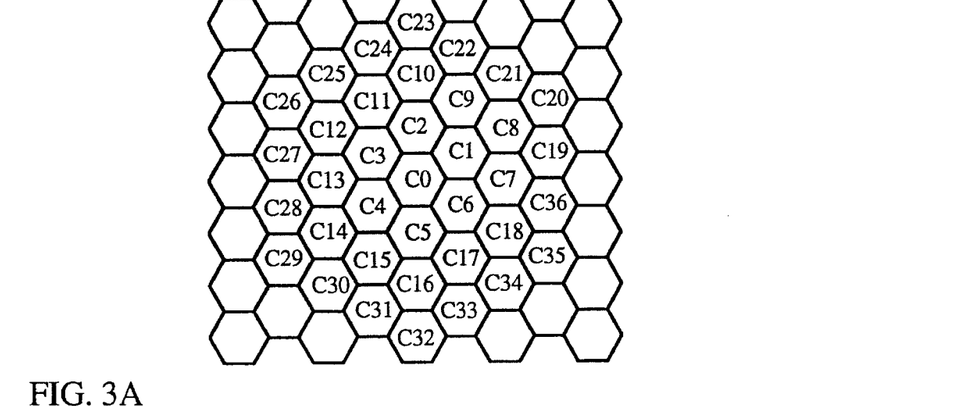
FIGS. 3A shows a hexagonally partitioned region corresponding to the coverage area of an exemplary multiple access communication system.
Figure 3B:
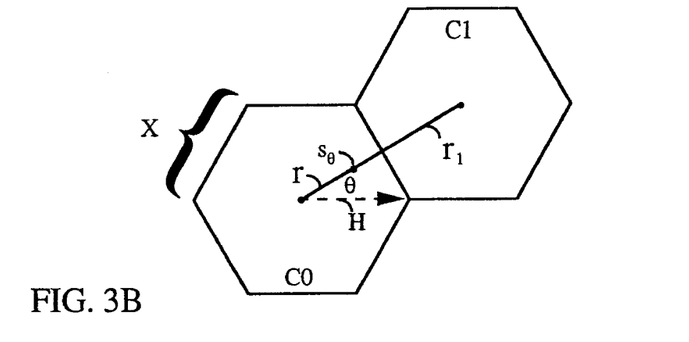
FIG. 3B depicts a pair of adjacent hexagonal cells included within the coverage area of FIG. 3A.

Referring to FIG. 3A, a hexagonally partitioned region is shown corresponding to a coverage area for an exemplary multiple access communication system. The coverage area includes a plurality of hexagonal cells, labeled or numbered as C1–C36, surrounding a simulated cell C0, which is shown in greater detail in FIG. 3B. As shown in FIG. 3B, a fixed or mobile subscriber S0 is positioned within cell C0 which is surrounded by a first tier of cells C1 to C6 (FIG. 3A), which is in turn surrounded by a second tier of cells C7 to C18, and so on. Although the coverage area of the exemplary system has been hexagonally partitioned for purposes of analysis, it is understood that the teachings of the invention are equally pertinent to cells of other geometry.

In an exemplary embodiment, a cell-site transmitter (not shown) is positioned within the center of each hexagonal cell and is assumed to be equipped with an omni-directional antenna. Outside the hexagonal cell serviced by each transmitter, large-scale variation in the signal energy transmitted by each transmitter can be represented by a log-normally distributed random variable. The mean of the signal power ($S_m$) received by subscriber unit S0 from cell-site transmitters in other cells decreases as a function of the radial distance (d) from such cells raised to a power $\gamma$, and may be represented as:

$$S_m = \frac{k}{d^\gamma} \quad (1)$$

where k is a proportionality constant. In geographic regions relatively devoid of large-scale structures (e.g., rural and suburban areas) it has been found that the dependence of received signal power $S_m$ on the radial distance d (in miles) may be approximated by:

$$S_m = -157.77 - 10\gamma \log d + p_t + G_c + G_m + 20 \log H_c + 10 \log H_m \quad (2)$$

where $P_t$ denotes the signal power (dBw) transmitted from the cell-site, $G_c$ represents the gain of the cell-site antenna relative to a $\lambda/2$ dipole (dB), $G_m$ is the gain of the subscriber unit antenna relative to a $\lambda/2$ dipole (dB), $H_c$ corresponds to the height of the cell-site antenna, and $H_m$ corresponds to the height of the subscriber antenna.

Referring again to FIG. 3B, the square of the distance ($r_i^2$) between the subscriber unit S0 and a transmitter at the center of the $i^{th}$ cell Ci in the first tier may be expressed as:

$$r_i^2 = x^2 + r^2 - 2rx \cos[\theta - 30i], \ i=1,2,\ldots 6 \quad (3)$$

where x denotes the length of the linear segments forming the boundary of the hexagonal coverage areas, r is the distance vector between subscriber unit S0 and the center of cell C0, and q represents the angle between r and horizontal axis H in FIG. 3B. Similarly, the square of the distance from trait S0 to the center of the $i^{th}$ cell within the second tier is given by:

$$r_i^2 = y^2 + r^2 - 2ry \cos[\theta - 30(i-6)], \ i=2j+1, j=3,4 \ldots 8 \quad (4)$$

$$r_i^2 = z^2 + r^2 - 2rz \cos[\theta - 30(i-8)], \ i=2j, j=4,5 \ldots 9 \quad (5)$$

In equation (4), the parameter y represents the distance from the center of cell C0 to the center of cells C(2j+1), j=3,4,...,8, while in equation (5) the parameter z represents the distance from the center of cell C0 to the center of cells C(2j), j=4,5,...,9. In a like manner, the square of the distances from the subscriber unit S0 to the third-tier cells Ci ($19 \leq i \leq 36$, $i \neq 17+3j$, j=1,2,3,...,6), and Ci (i=17+3j, j=1,2,3,...,6) are determined according to the relationships (6) and (7):

$$r_i^2 = u^2 + r^2 - 2ry \cos[\theta - 15(i-18)], \ 19 \leq i \leq 36, \ i \neq 17+3j, \ j=1,2,3,\ldots,6 \quad (6)$$

$$r_i^2 = v^2 + r^2 - 2ry \cos[\theta - 30 - 20(i-20)], \ i=17+3j, \ j=1,2,3,\ldots,6 \quad (7)$$

in which, again, (r,$\theta$) specifies the location of subscriber unit S0 within cell C0, and R denotes the radius of the circle circumscribing the hexagonal cells. With reference to expressions (3) and (7):

$$x = \sqrt{3} \ R; \quad (8)$$

$$y = 2\sqrt{3} \ R; \quad (9)$$

$$z = 3 \ R; \quad (10)$$

$$y = \sqrt{21} \ R; \text{ and} \quad (11)$$

$$y = 3\sqrt{3} \ R. \quad (12)$$

In a particular exemplary embodiment, the composite interference power $T_t$ arising at the subscriber unit S0 due to signal transmissions from cell-sites within the first three tiers is defined according to:

$$T_t = k \sum_{i=1}^{36} \frac{1}{r_i^4} \quad (13)$$

where it is assumed that $\gamma$ is set equal to 4 in expression (1). Similarly, the interference from cells in the third tier, i.e., $T_3$, may be expressed as:

$$T_3 = k \sum_{i=19}^{36} \frac{1}{r_i^4} \quad (14)$$

Figure 4:
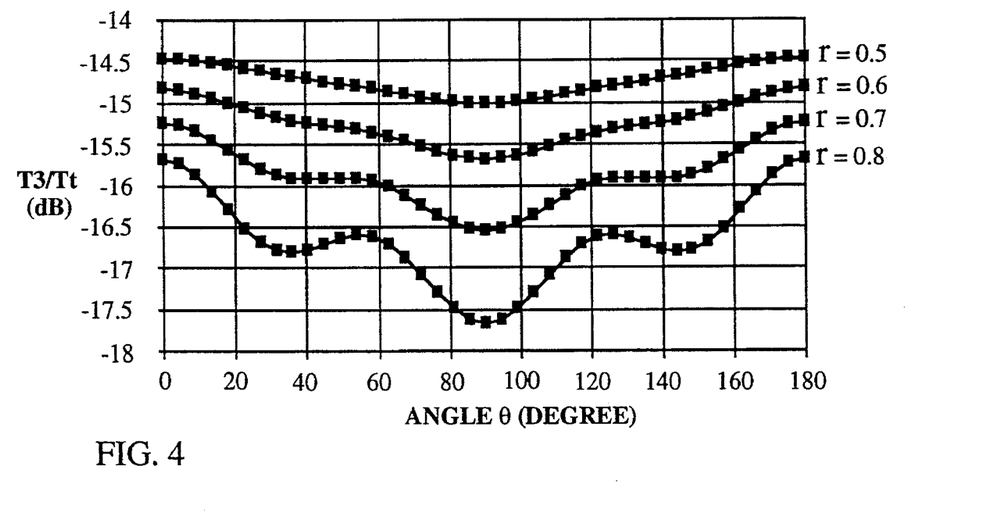
FIG. 4 graphically represents interference arising from third-tier cells relative to total interference.

Referring to FIG. 4, there is shown a graphical representation of the interference (dB) from the third-tier cells relative to the total interference ($T_3/T_t$), as a function of the angle $\theta$. Specifically, the quantity $T_3/T_t$ is plotted for four different subscriber unit positions r, i.e., r=0.5, 0.6, 0.7 and 0.8, relative to the center of cell C0, where r=1.0 corresponds to the distance between the center of cell C0 and its corners.

Inspection of FIG. 4 reveals that in the exemplary embodiment the maximum value of the ratio between $T_3$ and $T_t$ is less than −14 dB. Accordingly, for purposes of clarity the relatively minor interference contribution from cells in the third and higher-order tiers of cells is not considered in the following analysis of interference arising from the first and second tier cells.

Referring again to FIG. 3B, subscriber unit S0 is seen to be located proximate the boundary of cell C1. For such exemplary positioning the interference to which subscriber unit S0 is exposed may be viewed as arising from the following three sources:

(i) cell C1 closest to unit S0, (ii) the next two closest cells (C2 and C6), and (iii) the remaining fifteen other cells in the first and second tiers.

The interference components due to cells C1, C2 and C6 may be modeled as Rayleigh random variables characterized by the following components, respectively, of average interference power ($0 \le \theta \le 60$):

$$\bar{I}_1(r,\theta) = k \frac{1}{(x^2 + r^2 - 2rx \cos[\theta - 30])^2} \quad (15)$$

$$\bar{I}_2(r,\theta) = k \frac{1}{(x^2 + r^2 - 2rx \cos[\theta - 90])^2} = \bar{I}_1(r, \theta - 60) \quad (16)$$

$$\bar{I}_3(r,\theta) = k \frac{1}{(x^2 + r^2 - 2rx \cos[\theta + 30])^2} = \bar{I}_1(r, \theta + 60) \quad (17)$$

A fourth interference component, due to the remaining fifteen cells within the first and second tiers (FIG. 3A), is shown in FIG. 4 as described above. A composite "other-cells" $I_{oc}$ interference power corresponding to the sum of the interference components described above may be expressed as:

$$I_{oc} = k_2(\bar{I}_1(r,\theta) + \bar{I}_2(r,\theta) + \bar{I}_3(r,\theta) + \bar{I}_4(r,\theta)) \quad (18)$$

where $k_2$ is a proportionality constant. The ratio between the interference power $I_{oc}$ from other cells and the power $I_{or}$ received by a given subscriber unit from the transmitter within the cell in which the unit is located may be expressed as:

$$\frac{I_{oc}}{I_{or}} = r^4 (\bar{I}_1(r,\theta) + \bar{I}_2(r,\theta) + \bar{I}_3(r,\theta) + \bar{I}_4(r,\theta)) \quad (19)$$

where expression (19) is obtained from the ratio between expression (18) and equation (1).

As described below, in the preferred embodiment, an interference signal based on the normalized non-orthogonal interference component specified by equation (19) is injected into the signal produced by the base station transmitter servicing the cell of the subscriber unit under evaluation. In the preferred embodiment, a non-orthogonal interference signal is created by passing white Gaussian noise through a set of attenuators and a fader. The attenuators are adjusted to simulate the propagation losses occurring over a particular transmission path, while the fader enables the simulation of small-scale fluctuations in interference level. If $L_{pi}$, $i=1, \ldots 4$, respectively denote the average signal losses occurring over the transmission paths associated with the four interference components specified in expressions (15)–(18), then the required attenuator adjustments are determined on the basis of the following equality:

$$P_i + L_{pi} = G + L_{ai}, \ i=1,2, \ldots 4 \quad (20)$$

where $P_i$ corresponds to the transmitted power of the $i^{th}$ interference component, G represents the level of the White noise provided to channels within the base station transmitter, and $L_{ai}$ specifies the attenuation required over the transmitter channel dedicated to simulating the $i^{th}$ interference component.

In summary, the non-orthogonal interference component is simulated in the preferred embodiment in accordance with the procedure NON-ORTHOGONAL INTERFERENCE SIMULATION set forth below.

Non-Orthogonal Interference Simulation

I. Specify the following input parameters:

(a) subscriber unit location (r,θ), where 0<r<1 and 0<q<60, (b) signal propagation model [e.g., equation (1)], (c) cell base station and subscriber unit antenna gains and feeder losses (d) height of base station antenna, (e) output power ($P_i$) for each cell's base station transmitter, i=1,2, . . . ,N, and (f) radius (R) of each hexagonal cell.

II. Determine the value of each of the following interference components:

$$\bar{I}_1(r,\theta) = k \frac{1}{(x^2 + r^2 - 2rx \cos[\theta - 30])^{\gamma/2}} \quad (21)$$

$$\bar{I}_2(r,\theta) = k \frac{1}{(x^2 + r^2 - 2rx \cos[\theta - 90])^{\gamma/2}} = \bar{I}_1(r, \theta - 60) \quad (22)$$

$$\bar{I}_3(r,\theta) = k \frac{1}{(x^2 + r^2 - 2rx \cos[\theta + 30])^{\gamma/2}} = \bar{I}_1(r, \theta + 60) \quad (23)$$

where $$\bar{I}_4 = k \sum_{i=4}^{15} \frac{1}{r_i^\gamma} \quad (24)$$

$$x = \sqrt{3} \ R; \quad (25)$$

and where k is determined by making the required substitutions of the input parameters specified above into equations (1) and (2).

III. Generate white (i.e., Gaussian) noise of power G, and adjust the attenuation levels ($L_{aj}$, j=1,2, . . . 4) to produce the four interference signals established in section II. Again, the required attenuation levels $L_{aj}$ may be determined from the following equality:

$$P_j + L_{pj} = G + L_{aj}, \ j=1,2, \ldots ,4 \quad (26)$$

Orthogonal Component

As noted above, the power transmitted by each cell-site or cell base station is shared among pilot, sync, paging, and traffic channels. The share of power allocated to the traffic channel associated with a given cell-to-subscriber link may be varied in accordance with the location of the subscriber unit and the system load. Power is allocated among the traffic channels supported by the cell-site transmitter of the simulated cell through digital adjustment of the gain associated with each channel. The gain of each channel within the exemplary system will typically be represented by an unsigned 7-bit gain coefficient used to regulate the magnitude of both the in-phase (I) and quadrature phase (Q) channel components.

The power levels associated with each traffic channel are dependent not only on the values of the corresponding digital gains, but also on the data rate of each. Specifically, the energy per code symbol ($E_S$) is proportional to $r_i$, where $r_i$ denotes the normalized data rate. In accordance with the invention, the orthogonal interference component is made to be orthogonal to the other channels actually supported by the cell-site. Included among these other channels are pilot, sync, and paging channels, as well as $N_r$ "real" traffic channels allocated to users physically present within the simulated cell.

The orthogonal component of power S transmitted over the radio or communication channel is adjusted by a cell controller on the basis of the digital gain factor and an equivalent data rate $r_{eq}$ corresponding to an average of the data rates of a set of simulated traffic channels. More specifically, the orthogonal component of power S radiated over the radio channel is designed to simulate the transmission of $N_s$ simulated traffic channels at the equivalent rate $r_{eq}$.

In an exemplary embodiment in which interference power S is designed to emulate voice communication, equivalent rate $r_{eq}$ is determined using a sixteen-state, second order Markov model. Each state within the model is defined by the speech rates (e.g., full-rate, half-rate, quarter-rate or eighth-rate) associated with a pair of consecutive speech frames. For example, as used in the following, state "0" corresponds to a pair of consecutive frames characterized by full-rate speech activity. Table I below sets forth the rates of speech activity for the pair of speech frames associated with each of sixteen Markov states.

TABLE I

| Frame Rate for Previous Frame (N−1) | Frame Rate for Current Frame (N) | Process State |
|---|---|---|
| full | full | 0 |
| full | half | 1 |
| full | quarter | 2 |
| full | eighth | 3 |
| half | full | 4 |
| half | half | 5 |
| half | quarter | 6 |
| half | eight | 7 |
| quarter | full | 8 |
| quarter | half | 9 |
| quarter | quarter | 10 |
| quarter | eighth | 11 |
| eighth | full | 12 |
| eighth | half | 13 |
| eighth | quarter | 14 |
| eighth | eighth | 15 |

In accordance with second order Markov model theory, the probability of the occurrence of a given speech rate within a Frame (N+1) may be determined based on the rates indicated by the states of preceding Frames (N) and (N−1). Referring below to the first entry within Table II, there exists a probability of 0.911 that full-rate speech will exist in Frame (N+1) in the situation where both Frames (N) and (N−1) are at full rate and the Markov chain is set at state "0". The remainder of Table II gives the probabilities of transitioning to the indicated speech rate in Frame (N+1) for the other possible pairs of Markov states associated with Frame (N) and Frame (N−1).

TABLE II

| State of Current Frame (N) | Frame Rate for Previous Frame (N−1) | Frame Rate for Current Frame (N) | Frame Rate for Future Frame (N+1) | State of Future Frame (N+1) | Transition Probability |
|---|---|---|---|---|---|
| 0 | full | full | full | 0 | 0.911 |
| 0 | full | full | half | 1 | 0.089 |
| 0 | full | full | quarter | 2 | 0 |
| 0 | full | full | eighth | 3 | 0 |
| 1 | full | half | full | 4 | 0.229 |
| 1 | full | half | half | 5 | 0.133 |
| 1 | full | half | quarter | 6 | 0.638 |
| 1 | full | half | eighth | 7 | 0 |
| 2 | full | quarter | full | 8 | 0 |
| 2 | full | quarter | half | 9 | 0 |
| 2 | full | quarter | quarter | 10 | 0 |
| 2 | full | quarter | eighth | 11 | 0 |
| 3 | full | eighth | full | 12 | 0 |
| 3 | full | eighth | half | 13 | 0 |
| 3 | full | eighth | quarter | 14 | 0 |
| 3 | full | eighth | eighth | 15 | 0 |
| 4 | half | full | full | 0 | 0.85 |
| 4 | half | full | half | 1 | 0.15 |
| 4 | half | full | quarter | 2 | 0 |
| 4 | half | full | eighth | 3 | 0 |
| 5 | half | half | full | 4 | 0.238 |
| 5 | half | half | half | 5 | 0.238 |
| 5 | half | half | quarter | 6 | 0.524 |
| 5 | half | half | eighth | 7 | 0 |
| 6 | half | quarter | full | 8 | 0.173 |
| 6 | half | quarter | half | 9 | 0.037 |
| 6 | half | quarter | quarter | 10 | 0.123 |
| 6 | half | quarter | eighth | 11 | 0.667 |
| 7 | half | eighth | full | 12 | 0 |
| 7 | half | eighth | half | 13 | 0 |
| 7 | half | eighth | quarter | 14 | 0 |
| 7 | half | eighth | eighth | 15 | 0 |
| 8 | quarter | full | full | 0 | 0.862 |
| 8 | quarter | full | half | 1 | 0.138 |
| 8 | quarter | full | quarter | 2 | 0 |
| 8 | quarter | full | eighth | 3 | 0 |
| 9 | quarter | half | full | 4 | 0.5 |
| 9 | quarter | half | half | 5 | 0.333 |
| 9 | quarter | half | quarter | 6 | 0.167 |
| 9 | quarter | half | eighth | 7 | 0 |
| 10 | quarter | quarter | full | 8 | 0.25 |
| 10 | quarter | quarter | half | 9 | 0.083 |
| 10 | quarter | quarter | quarter | 10 | 0 |
| 10 | quarter | quarter | eighth | 11 | 0.667 |
| 11 | quarter | eighth | full | 12 | 0.06 |
| 11 | quarter | eighth | half | 13 | 0.036 |
| 11 | quarter | eighth | quarter | 14 | 0.042 |
| 11 | quarter | eighth | eighth | 15 | 0.862 |
| 12 | eighth | full | full | 0 | 0.833 |
| 12 | eighth | full | half | 1 | 0.167 |
| 12 | eighth | full | quarter | 2 | 0 |
| 12 | eighth | full | eighth | 3 | 0 |
| 13 | eighth | half | full | 4 | 0.8 |
| 13 | eighth | half | half | 5 | 0 |
| 13 | eighth | half | quarter | 6 | 0.2 |
| 13 | eighth | half | eighth | 7 | 0 |
| 14 | eighth | quarter | full | 8 | 0.1 |
| 14 | eighth | quarter | half | 9 | 0.017 |
| 14 | eighth | quarter | quarter | 10 | 0.017 |
| 14 | eighth | quarter | eighth | 11 | 0.866 |
| 15 | eighth | eighth | full | 12 | 0.019 |
| 15 | eighth | eighth | half | 13 | 0.003 |
| 15 | eighth | eighth | quarter | 14 | 0.083 |
| 15 | eighth | eighth | eighth | 15 | 0.895 |

Table III shows the resulting first-order Markov steady-state probabilities for the existence of each of the four speech rates, i.e., full-rate, half-rate, quarter-rate and eighth-rate, as a function of the Markov state of the preceding frame. Table III may be generated based on the empirical speech activity data included within Table II by employing second order Markov techniques. In one approach, the entries within Table II are arranged into a 16×16 state transition probability matrix P. Assuming the existence of the sixteen states set forth in Table I, then the (i,j) entry of the matrix P represents the probability p(x|y) of transitioning from an $i^{th}$ state "x" to a $j^{th}$ state "y". For example, the probability p(0|1) of transitioning from state 0 (full, full) to state 1 (full, half) is 0.089.

In accordance with Markov model theory as disclosed by, for example, H. J. Larson and B. O. Shubert in *Probabilistic Models in Engineering Science*; Volume II; John Wiley and Sons (1979), for Markov chains having a finite number of states the associated n-step transition probabilities can be arranged into a stochastic matrix $P^{(n)}$. In this context, the Chapman-Kolmogorov equation may be expressed as:

$$P^{(n+m)} = P^{(n)} P^{(m)}, \qquad (27)$$

in which $P^{(n+m)}$ defines the state transition matrix after (n+m) transitions from an initial state transition matrix $P^{(1)}$. As n→∞, $$P^{(n)}=P^n=\ldots=\Pi, \quad (28)$$

where $\Pi$ denotes a steady state transition matrix. The matrix $\Pi$ is defined, for n→∞, as:

$$P^{(n)}(x|y) \to \Pi(y). \quad (29)$$

Hence, as n→∞ the probability of the existence of a state "y" approaches a constant value independent of "n" and of the initial state probabilities. It follows that the matrix $\Pi$ may be obtained by solving the following matrix equation:

$$\Pi = \Pi P \quad (30)$$

where, again, the matrix P is compiled from empirical voice activity statistics such as those included in Table II.

TABLE III

| State of Frame (N−1) | Speech Rate of Frame (N) | Steady State Probability | Overall Probability |
|---|---|---|---|
| 0 | full | 0.3345 | |
| 1 | full | 0.0351 | |
| 2 | full | 0.000 | |
| 3 | full | 0.000 | 0.3696 ($p_1$) |
| 4 | half | 0.0134 | |
| 5 | half | 0.0070 | |
| 6 | half | 0.0271 | |
| 7 | half | 0.000 | 0.0475 ($p_2$) |
| 8 | quarter | 0.0097 | |
| 9 | quarter | 0.0020 | |
| 10 | quarter | 0.0040 | |
| 11 | quarter | 0.0556 | 0.0713 ($p_3$) |
| 12 | eighth | 0.0120 | |
| 13 | eighth | 0.0034 | |
| 14 | eighth | 0.0402 | |
| 15 | eighth | 0.4560 | 0.5116 ($p_4$) |
| Equivalent Data Rate ($r_{eq}$) | | | 0.4751 |

Referring to Table III, the overall probability of a given speech rate existing in an arbitrary frame is obtained by summing all of the steady-state probabilities corresponding to the given speech rate. For example, summing the first four entries within the "Steady State Probability" column of Table III yields an overall probability ($P_1$) of 0.3696 that full-rate speech activity will exist within any arbitrary speech frame. Similarly, there exists an overall probability ($P_4$) of 0.5116 that the speech rate of an arbitrary frame will be eighth-rate.

The equivalent data rate $r_{eq}$ is computed based on the rate statistics vector P, where P=$p_1,\ldots,p_4$, which corresponds to the set of overall probabilities associated with the occurrence of each speech rate. Specifically, the fractional value associated with each speech rate (i.e., full-rate=1.0, half-rate=0.5, quarter-rate=0.25, and eighth-rate=0.125) is multiplied by its associated overall probability (i.e., by $P_1$, $p_2$, $p_3$, or $p_4$) and the resulting four product terms are summed in order to obtain $r_{eq}$.

In an exemplary system, the traffic channels dedicated to actual subscriber units within a particular cell are each periodically "punctured" with a power control bit used to regulate the transmission power of the recipient subscriber unit. The present invention accounts for this puncturing by modifying equivalent data rate $r_{eq}$ to a punctured data rate μ, where $$\mu = p_1 + \left(\frac{1}{12} + \frac{11}{12} 0.5\right) p_2 + \left(\frac{1}{12} + \frac{11}{12} 0.25\right) p_3 + \left(\frac{1}{12} + \frac{11}{12} 0.125\right) p_4 \quad (31)$$

The variance, $s^2$, of the punctured data rate may be expressed as:

$$\sigma^2 = p_1 + \left(\frac{1}{12} + \frac{11}{12} 0.5\right) p_2 + \left(\frac{1}{12} + \frac{11}{12} 0.25\right) p_3 + \left(\frac{1}{12} + \frac{11}{12} 0.125\right) p_4 - \mu^2 \quad (32)$$

The power control bit will generally be of a length equivalent to the length of two of the data symbols included within a given frame. Since, in an exemplary implementation, there exist twenty-four code symbols in a 1.25 msec frame, the power control sub-channel occupies approximately one-twelfth of each data frame.

In summary, the orthogonal component of the transmitted interference power S is preferably generated in accordance with the procedure ORTHOGONAL INTERFERENCE SIMULATION given below.

Orthogonal Interference Simulation

I. Specify the following input parameters:

(a) number of users $N_u$ loading the cell, where $N_s=N_u-N_r$, (b) number of traffic channels $N_r$ allocated to actual users within the cell, (c) a lookup table specifying transmitter gain as a function of the number subscriber traits and their location within the simulated cell, (d) the rate statistics vector P, P=$p_1,\ldots,p_4$, representative of, for example, the speech or data rate associated with the energy transmitted over the simulated noise channel, and (e) a coloring filter coefficient α representative of the degree of correlation between successive frames.

II. Generate a Gaussian random variable, of zero mean and having a standard deviation of unity, at 20 msec. intervals in order to create a 50 Hz random data process. The random variable is preferably generated using a random number generator in conjunction with a look-up table configured to map a uniform random process into a Gaussian distribution. Each random variable is used as an index value to retrieve a corresponding Gaussian value from the look-up table. The random number generation may be effected using a linear congruential sequence such as is described by D. E. Knuth in *The Art of Computer Programming*, 2nd edition, Addison-Wesley, 1973. Specifically, the following recursive expression is employed in an exemplary embodiment to generate the congruential sequence:

$$X_{i+1}=(X_i*A+C) \bmod M. \quad (33)$$

Figure 5:
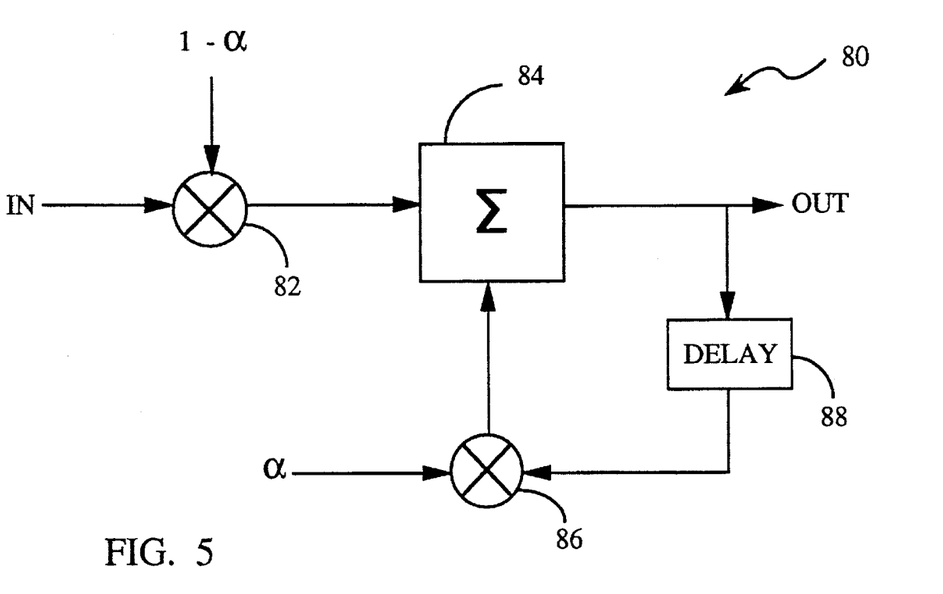
FIG. 5 depicts a block diagram of an analog low-pass filter from which may be derived a digital low-pass filter used in processing a Gaussian noise sequence in accordance with the invention.

III. Pass each Gaussian value retrieved from the look-up table through a digital low pass filter. FIG. 5 depicts a block diagram of a digital low-pass filter (LPF) 80 which may be derived from an analog LPF. Referring to FIG. 5, each filter input value is multiplied by a weighting factor 1—a using a first multiplier 82, where the parameter a is related to the cut off frequency of the filter 80. Each weighted input value is combined in a summation element or summer 84 with a product produced by a second multiplier 86. Multiplier 86 receives parameter a as a first input, and receives a delayed version of the output of summer 84 as a second input from a delay element 88. In the preferred embodiment, the parameter a is selected to be close to unity, and the filter time constant is chosen to be approximately ten frames in duration (e.g., 200 ms.).

The transfer function of the corresponding analog filter is:

$$H(w) = \frac{a}{a + j\omega} \quad (34)$$

which yields an impulse response of:

$$h(t) = a \exp[-at]u(t) \quad (35)$$

The deterministic autocorrelation of h(t) is given by:

$$\rho(t) = h(t) * h^+(-t) = F^{-1}|H(w)|^2 = \frac{1}{2}\exp[-a|t|] \quad (36)$$

where * is the convolution operation, and h' (−t) is the conjugate of h(−t). Assuming the parameter "a" to be selected such that a=1/kT, then the filter correlation coefficient is $e^{-1}$ at each sampling time $t_s$, where $t_s$=kT.

By applying impulse invariance techniques, the pole location ($z_p$) of digital LPF 80 is found to be equivalent to the value of the parameter α, i.e., $z_p$=exp [−aT]=exp [−1/k] =α. Accordingly, the digital filter transfer function H(z) is given by:

$$H(z) = \frac{1 - \alpha}{1 - \alpha z^{-1}} \quad (37)$$

which yields a bandwidth of:

$$B_n = \frac{1}{2\pi} \sum_{-\infty}^{\infty} |H(\omega)|^2 d\omega \quad (38)$$

IV. Scale the output of the digital filter 80 filter by an average data rate coefficient "e" and shift the output in accordance with a standard deviation coefficient "f", where $$f = N_s \mu \quad (39)$$

and $$e = \sqrt{\frac{N_s}{B_n}} \sigma \quad (40)$$

and where $N_s$ denotes the number of simulated users within the cell, and where μ and $\sigma^2$ are defined in equations (31) and (32). In a preferred implementation, the data rate coefficient "e" is modified in order to account for puncturing of the data stream with power control information.

V. Determine the digital gain corresponding to the orthogonal component of power S transmitted over the interference simulation channel in accordance with the aggregate number $N_u$ of traffic channels loading the cell, and the number of traffic channels $N_r$ allocated to actual users.

VI. For each of the $N_r$ actual traffic channels the coefficients of a FIR filter (FIG. 8) associated with each channel are adjusted according to the average data rate. This adjustment is effected by multiplying the coefficients of a given FIR filter by the square root of the data rate of the associated channel.

Simulation Apparatus

As was noted above, the present invention provides a method and apparatus for simulating the effect of signal interference received by a subscriber unit within a multiple-access communication system due to data transmission on a selected set of communication or traffic channels. The present invention enables the performance of a given multiple-access communication system to be evaluated prior to network deployment, or allows debugging during operation, by simulating a level of interference expected to be experienced during normal operation. The multiple-access systems to which the teachings of the present invention may be applied include, for example, the United States version of Time Division Multiple Access (USTDMA), the pan-European Global System for Mobile Communication (GSM), and CDMA communication systems.

In accordance with the invention, a desired level of traffic channel interference may be simulated by adding a noise signal of predetermined statistical properties and power level to the signal transmitted by the cell-site base station located within the cell of the subscriber unit under evaluation. The predefined statistical properties and power level of the noise signal are functions of the locations of neighboring base stations relative to the location of a particular subscriber unit under test. Alternatively, an analogous interference signal is directly injected into the receiver of the subscriber unit under test. In the latter instance the injected signal is formulated so as to account for the effects of propagation over the transmission path between the cell-site base station and the subscriber unit under test.

Figure 6:
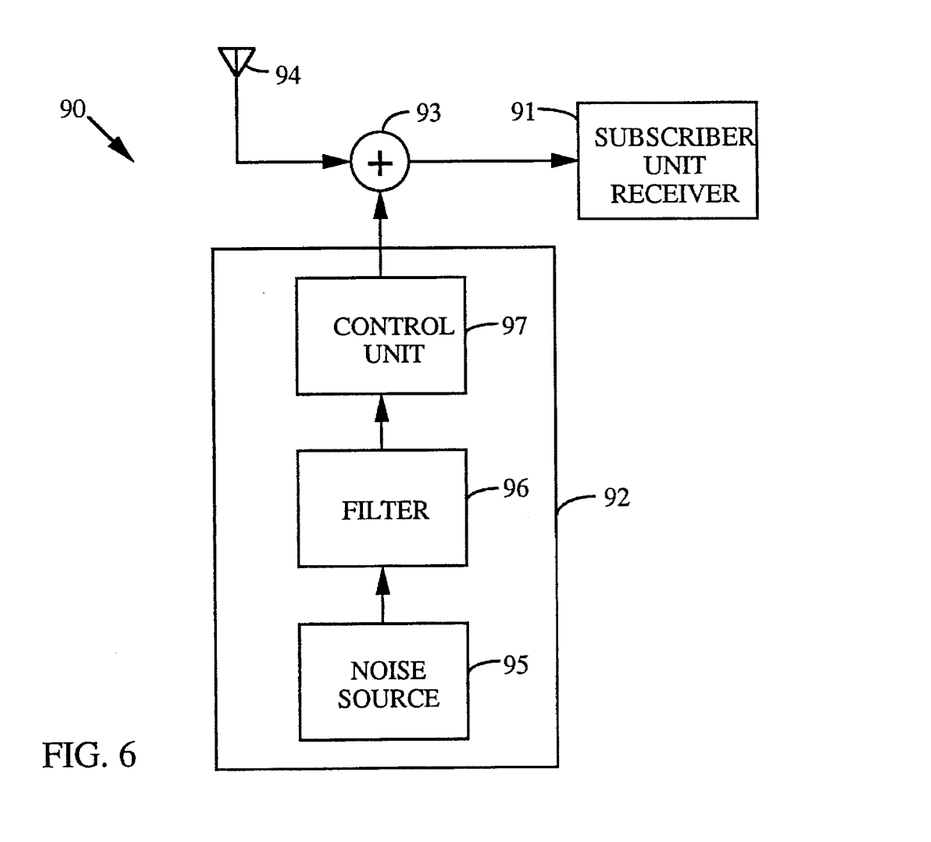
FIG. 6 shows a simplified block diagram of the receive section of an exemplary subscriber unit employing a preferred embodiment of an interference simulation apparatus of the present invention.

Turning now to FIG. 6, a simplified block diagram of a receive section 90 is shown for an exemplary subscriber unit which includes a preferred embodiment of the interference simulation apparatus of the present invention. Receive section 90 includes a subscriber unit receiver 91, as well as an interference simulation apparatus 92 designed to simulate the interference created by base stations in cells proximate the cell the subscriber unit under test is located in. The interference signal produced by simulation apparatus 92 is combined together with the signal received from a subscriber unit antenna 94 in a summer 93. The resulting composite signal is then processed by subscriber unit receiver 91 in a conventional manner.

Simulation apparatus 92 includes a noise source 95 for generating interference noise, typically in the form of a white Gaussian noise signal, having a predefined spectral density. The noise signal from noise source 95 is then passed through a bandpass filter 96 and provided to control unit 97. The passband center frequency of noise filter 96 is selected to be the same as the center frequency of the base station to subscriber unit channel, i.e., downlink, being simulated. Similarly, the bandwidth of filter 96 is specified to be substantially equivalent to the spectral width of the traffic channels utilized by the multiple-access system under evaluation. For example, for simulation of interference in USTDMA communication systems the bandwidth of filter 96 will preferably be on the order of 30 kHz. In a like manner, a filter bandwidth of approximately 200 kHz would be employed during simulation of a GSM communication system.

Referring again to FIG. 6, control unit 97 supplies an interference signal to summer 93 on the basis of the signal produced by filter 96. In an exemplary implementation, control unit 97 may be realized, for example, by using an adjustable attenuator in conjunction with signal conditioning electronics. The attenuator is set to provide an interference level in accordance with various aspects of the system under evaluation. For example, the requisite interference level will generally be influenced by the number of neighboring base stations expected to contribute to the received signal interference, the locations of such base stations relative to the subscriber unit under evaluation, and the propagation characteristics of the communication links between these base stations and the subscriber unit. The signal conditioning electronics (e.g., a microprocessor) are utilized to impart predefined statistical properties on the interference signal. A more detailed description of a simulation apparatus specifically directed to a CDMA communication system is described below with reference to FIG. 7.

Figure 7:
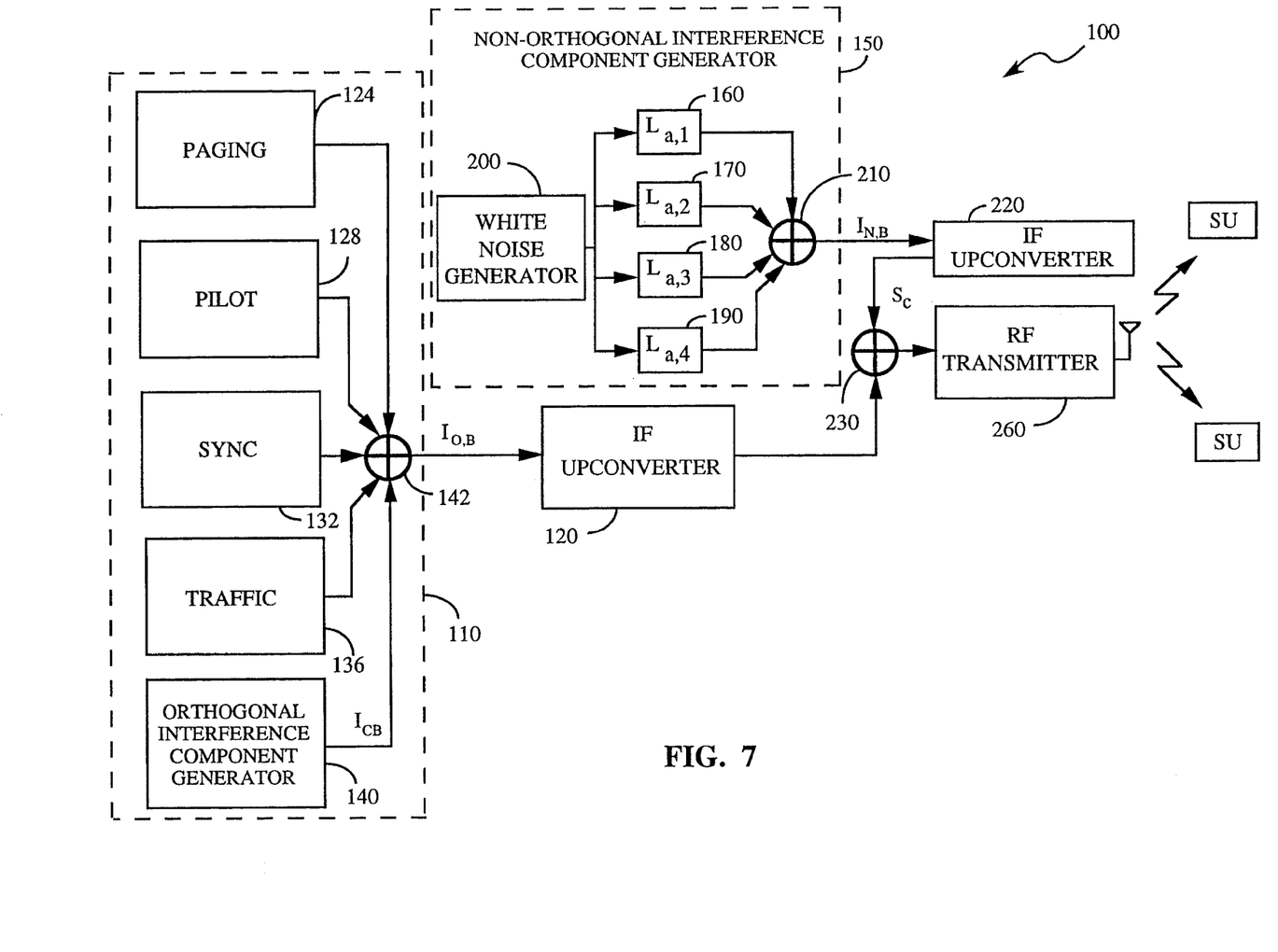
FIG. 7 shows a block diagram of an exemplary cell-site transmitter employing a preferred embodiment of the interference simulation apparatus of the present invention.

FIG. 7 shows a block diagram of an exemplary cell-site base station transmitter 100 modified to include a preferred embodiment of the interference simulation apparatus of the present invention. Transmitter 100 includes a cell-to-subscriber link waveform generation network 110 for producing paging, pilot, sync, actual traffic channels and a baseband interference signal $I_{CB}$. The $I_{CB}$ signal is used in synthesizing the orthogonal component of the signal energy, $I_{O,B}$, transmitted over the interference simulation channel. Specifically, the waveform generation network 110 includes paging, pilot, sync, forward traffic (i.e., data), and interference orthogonal component generators 124, 128, 132, 136 and 140, respectively, the outputs of which are combined within a digital summation element or adder 142. A manually adjustable attenuator (not shown) may optionally be interposed between digital adder 142 and a first IF upconverter 120. In the exemplary embodiment of FIG. 7, first IF upconverter 120 provides an output signal at 70 MHz in response to the supplied baseband signal $I_{O,B}$.

Again referring to FIG. 7, cell-site transmitter 100 further includes a non-orthogonal signal interference generator 150. The interference generator includes first, second, third, and fourth digital attenuators 160, 170, 180, and 190 for providing the attenuation $L_{ai}$ required over the transmitter channel dedicated to simulating the $i^{th}$ interference component, where in the exemplary embodiment i=1, . . . , 4. Attenuators 160, 170, 180, and 190 are each supplied with a an output from a digital noise process from a white noise generator 200, and are adjusted in response to digital control signals provided by a controller (not shown). The resulting interference components created by attenuators 160, 170, 180, 190 ($L_{ai}$) are then combined within a digital summation element or adder 210. The output of digital adder 210 is translated in frequency to 70 MHz by a second IF upconverter 220 prior to being provided to an input port of a digital adder 230.

As is indicated in FIG. 7, the signals representative of orthogonal and non-orthogonal component interference are combined within digital adder 230 to form a composite interference signal $S_c$. The composite interference signal $S_c$ is then radiated by an RF transmitter 260 to one or more subscriber units (SU) within the simulated cell.

Figure 8:
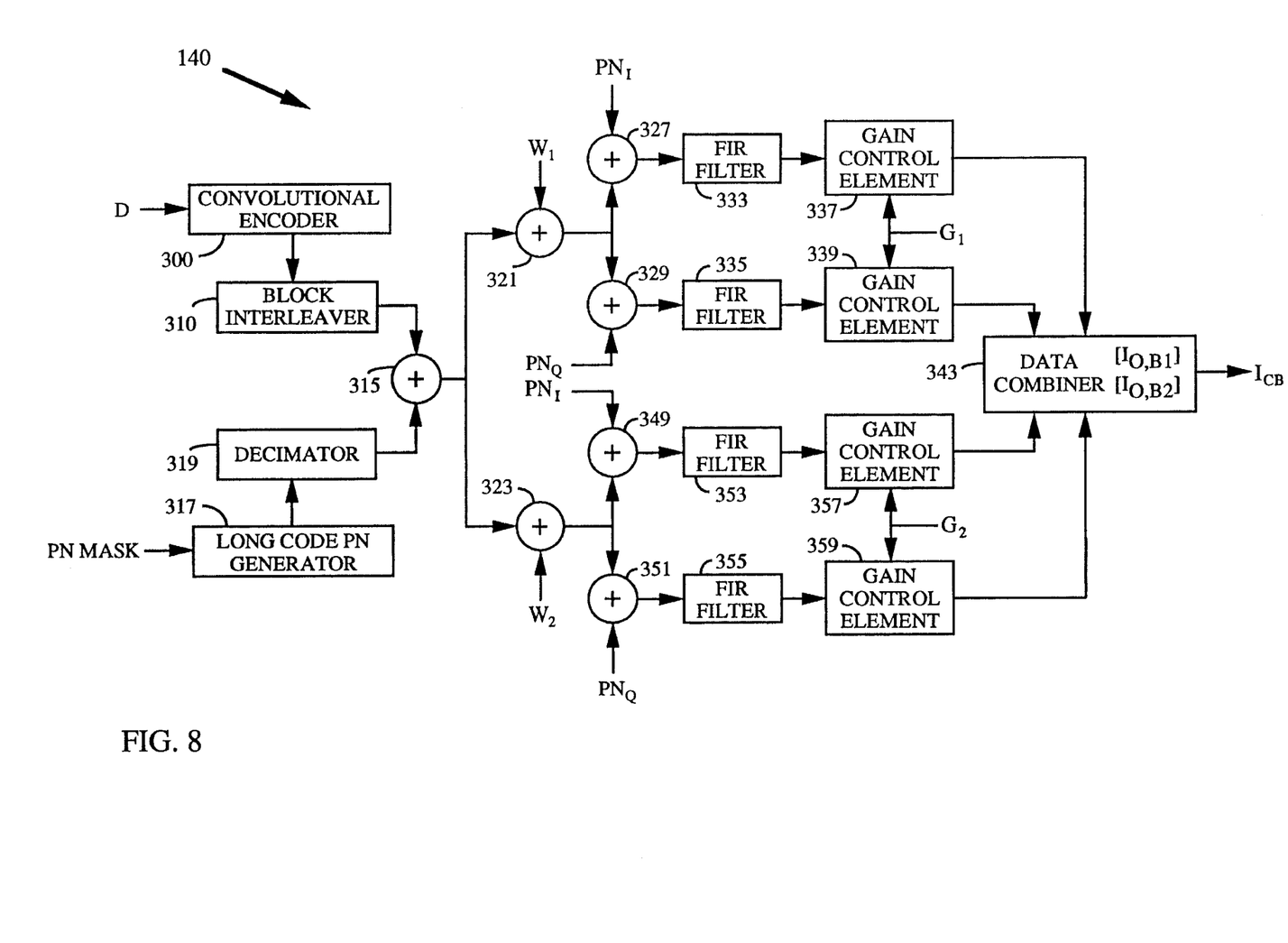
FIG. 8 depicts an exemplary implementation of an interference channel waveform generator designed to generate an interference signal representative of a plurality of orthogonal traffic channels within a simulated cell.

Referring to FIG. 8, an exemplary implementation of a single interference channel component generator 140 is shown, which is designed to generate an interference signal representative of up to twelve orthogonal traffic channels. In particular, a first set of six traffic channels may be simulated over a first interference channel covered by a first Walsh code $W_1$, while a second set of six traffic channels may be simulated over a second interference channel covered by a second Walsh code $W_2$. A limiting factor in the number of simulated channels per interface is the gain settings. A large gain setting can cause saturation which would not accurately represent the output power from a corresponding number of users. It is envisioned that additional simulated channels may be developed by using additional traffic channel resources such that for each Walsh code as additional six simulated traffic channels are provided.

In an exemplary embodiment, interference generator 140 includes a convolutional encoder 300 for receiving a repetitive sequence of identical non-zero data frames (D) at a predetermined rate (e.g., 9.6 kbps). The input data is convolutional encoded with code symbol repetition in accordance with the input data rate and sequence length of Walsh codes $W_1$ and $W_2$. For the exemplary input data rate of 9.6 kbps, each symbol is rate ½ convolutionally encoded so as to create a coded symbol stream at 19.2 ksps.

As shown in FIG. 8, an input stage of interference component generator 140 further includes an interleaver 310, a modulo-2 adder or exclusive-OR gate 315, as well as a long code PN generator 317 and a decimator 319 for generating PN scrambling code PNs. The encoded data from encoder 300 is provided to interleaver 310 where, in the exemplary embodiment, it is convolutional interleaved. The interleaved symbol data is then output from interleaver 310 at the exemplary rate of 19.2 ksps to an input of exclusive-OR gate 315, and is scrambled by a PN scrambling code PN sequence provided to another input of exclusive-OR gate 315, from decimator 319.

PN generator 317 operates to provide, in accordance with the supplied PN mask, a long PN code at a fixed chip rate of 1.228 Mchp/s to decimator 319. The use of the PN mask provides a shift in the PN code which provides uniqueness for the user. Decimator 319 produces a scrambling PN code of an exemplary rate of 19.2 ksps from the long PN code by using one of every 64 chips produced by PN generator 317. In the preferred embodiment, the repetitive long code provided to decimator 319 is $2^{42}-1$ PN chips in duration, and is recursively derived by generator 317 in accordance with the polynomial p(x), where:

$$p(x)=x^{42}+x^{35}+x^{33}+x^{31}+x^{27}+x^{26}+x^{25}+x^{22}+x^{21}+x^{19}+x^{18}+x^{17}+x^{16}+x^{10}+x^{7}+x^{6}+x^{5}+x^{3}+x^{2}+x^{1}+1. \quad (41)$$

More specifically, generator 317 produces each PN chip of the long code by taking the modulo-2 inner product of a 42-bit PN mask and the 42-bit state vector.

The output of exclusive-OR gate 315 is provided to an input of each of two modulo-2 adders or exclusive-OR gates 321 and 323. The Walsh code sequence $W_1$ is provided as a second input to exclusive-OR gate 321, while the Walsh sequence $W_2$ is supplied as a second input to exclusive-OR gate 323. The scrambled symbol data and Walsh sequence $W_1$ are modulo-2 added (exclusive-OR'ed) by exclusive-OR gate 321, with the result provided as an input to each of two modulo-2 adders or exclusive-OR gates 327 and 329. Pseudorandom noise $PN_I$ and $PN_Q$ sequences corresponding to a particular cell sector or address are provided as second inputs to exclusive-OR gates 327 and 329, respectively. The $PN_I$ and $PN_Q$ signals are exclusive-OR'ed with the output of exclusive-OR gate 321 providing results which are in turn provided as inputs to Finite Impulse Response (FIR) filters 333 and 335, respectively. The input symbols are filtered according to an input data rate label from interleaver 310. The filtered signals output from FIR filters 333 and 335 are provided to a portion of transmit power control circuitry comprising two gain control elements 337 and 339. In accordance with the invention, a 7-bit gain control word $G_1$ derived as described above in reference to the ORTHOGONAL INTERFERENCE SIMULATION procedure, is provided to each of the two gain control elements 337 and 339. Again, the value of gain control word $G_1$ is selected to be such that the orthogonal component of power S radiated over the interference simulation channel covered by Walsh symbol $W_1$ corresponds to transmission of $N_s$ simulated traffic channels at an equivalent rate $r_{eq}$, where $N_s \in \{0,1,2,3\}$. In embodiments wherein the traffic channels carry voice data, gain control word $G_1$ is preferably updated at 20 millisecond intervals to adequately simulate fluctuations in voice activity. The signals output from gain control elements 337 and 339 are combined within a data combiner 343 which operates to produce a first baseband interference signal $I_{O,B1}$.

As shown in FIG. 8, the scrambled symbol data is also exclusive-OR'ed with Walsh sequence $W_2$ using exclusive-OR gate 323, with the result provided as an input to each of two modulo-2 adders or exclusive-OR gates 349 and 351. The pseudorandom noise $PN_I$ and $PN_Q$ sequences are also provided as second inputs to exclusive-OR gates 349 and 351, respectively, in order to allow modulo-2 adding (exclusive-OR'ing) with the output of exclusive-OR gate 321. The symbol stream produced by exclusive-OR gate 321 is filtered by Finite Impulse Response (FIR) filters 353 and 355, with the resulting filtered signals being provided to a portion of transmit power control circuitry comprising two gain control elements 357 and 359. A 7-bit gain control word $G_2$ is selected to be such that the orthogonal interference component covered by Walsh symbol $W_2$ corresponds to a desired number of simulated traffic channels (i.e., 0,1, 2 or 3) is provided to gain control elements 357 and 359. The signals output from gain control elements 357 and 359 are combined within a data combiner 343 to produce a second baseband interference signal $I_{O,B2}$. The two $I_{O,B1}$ and $I_{O,B2}$ signals are further combined by superposition of the two signals by data combiner 343 to generate a composite baseband interference signal $I_{CB}$. The $I_{CB}$ signal is output by data combiner 343 and provided as an input to digital adder 142 (FIG. 7).

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

I claim:

1. A method for simulating signal interference in a communication system in which information is communicated over at least one communication channel, comprising the steps of:

determining a first composite signal energy for signal transmission within said communication system over a first set of simulated communication channels;

determining a first average data rate for said first composite signal energy; and adjusting a level of signal energy transmitted over said at least one communication channel in response to a first interference signal which is based on said first composite signal energy and average data rate.

2. The method of claim 1 further comprising the steps of:

determining a second composite signal energy associated with signal transmission over a second set of simulated communication channels;

determining a second average data rate for said second composite signal energy; and generating a second interference signal based on said second composite signal energy and second average data rate.

3. The method of claim 2 further comprising the step of modifying said first interference signal in response to said second interference signal.

4. The method of claim 1 further comprising the step of generating said first interference signal according to the steps of:

generating a sequence of random variables; and shaping the spectrum of said sequence of random variables by filtering them in accordance with a predetermined correlation function.

5. The method of claim 4 further comprising the step of scaling said sequence of random variables based on said first average data rate.

6. The method of claim 4 further comprising the step of shifting said sequence of random variables based on a magnitude of said first composite signal energy.

7. The method of claim 1 wherein the step of determining a first average data rate comprises the step of establishing a set of data rates for users transmitting over said simulated communication system channels.

8. The method of claim 1 further comprising the steps of:

determining a number of real traffic channels allocated to system subscribers for said communication system;

determining an equivalent number of communication channels to be simulated corresponding to a difference between said first set of simulated communication channels and said number of real traffic channels;

determining said first composite signal energy by estimating the sum of signal energy transmitted over said equivalent number of communication channels;

determining said first average data rate at which said signal energy is transmitted over said equivalent number of communication channels; and generating a first interference signal with an energy based on said first composite signal energy and average data rate.

9. In a wireless communication system in which users communicate information signals between one another using at least one of a plurality of base stations that each include at least one base station transmitter that uses multiple access type communication signals to transfer information over at least one channel, a method for simulating signal interference power in at least said one channel, comprising the steps of:

determining a first composite signal energy for signal transmission within said communication system over a first set of simulated communication channels at least being serviced by said at least one base station;

determining a first average data rate for said first composite signal energy; and generating a first interference signal having a signal energy based on said first composite signal energy and average data rate.

10. The method of claim 9 further comprising the step of transmitting said first interference signal over said at least one communication channel.

11. The method of claim 9 further comprising the step of providing said first interference signal as an input to at least one communication system user receiver serviced by said base station.

12. The method of claim 9 wherein said users communicate using code division multiple access (CDMA) spread spectrum type communication signals, and said base station and users are located in a first cell within the communication system, wherein the step of determining a first composite signal energy comprises the steps of:

determining an equivalent number of channels to be simulated which corresponds to a difference between a predetermined total number of desired channels in said first set and a number of real channels actually in use within said first cell; and determining a composite signal energy by estimating a sum of signal energy which is transmitted over said equivalent number of simulated channels.

13. The method of claim 12 wherein the step of determining a first average data rate comprises the step of determining a first data rate at which users transfer said composite signal energy over said equivalent number of simulated channels.

14. The method of claim 12 further comprising the step of monitoring the channels of said communication system to determine the number of real channels in use.

15. A method for simulating signal interference in a channel in a communication system in which information is communicated over at least one such communication channel, with said communication system including a first cell having a first base station transmitter from which information is transmitted over said communication channel, comprising the steps of:

provided an orthogonal signal energy associated with signal transmission at a first average data rate from said base station transmitter over a first set of simulated communication channels;

determining a non-orthogonal signal energy associated with signal transmission at a second average data rate from base station transmitters not located within said first cell; and adjusting power of signal energy transmitted over at least said first communication channel in accordance with said orthogonal and non-orthogonal signal energies.

16. The method of claim 15 further comprising the steps of: generating a first interference signal with an energy based on said first composite orthogonal and non-orthogonal signal energies; and transmitting said first interference signal over said at least one communication channel.

17. The method of claim 16 further comprising the step of generating said first interference signal according to the steps of:

generating a sequence of random variables; and shaping the spectrum of said sequence of random variables by filtering them in accordance with a predetermined correlation function.

18. The method of claim 17 further comprising the step of scaling said sequence of random variables based on said first average data rate.

19. The method of claim 15 wherein said communication system comprises a wireless telephone/data communication system in which remote users are located within a plurality of cells and communicate information signals to said base station located in said first cell using code division multiple access (CDMA) spread spectrum type communication signals.

20. A system for simulating signal interference in at least one communication channel in a communication system in which a base station in one cell communicates information signals with other users over such communication channels, comprising:

means for providing an electronic noise signal;

controller means for generating a noise intensity control signal based on a determination of signal energy transmitted by said base station over a first set of simulated channels; and means for adjusting the energy of said noise signal in response to said noise intensity control signal.

21. The system of claim 20 wherein said controller means further comprises means for determining a first average data rate at which said signal energy is transmitted by said base station, and said controller means is configured to additionally base said noise intensity control signal generation in part on this determination.

22. The system of claim 20 further comprising means for transmitting said adjusted noise signal as a first interference signal in order to simulate transmissions made over said communication channel.

23. The system of claim 20 wherein said controller means comprises means for determining signal energy transmitted over other simulated channels within said communication system, and said controller means is configured to additionally base said noise intensity control signal generation in part on said signal energy transmitted over said other simulated channels.

24. The system of claim 23 further comprising means for transmitting a second interference signal in order to simulate transmissions made from other base stations.

25. The system of claim 20 wherein said communication system comprises a wireless telephone/data communication system in which users are located within a plurality of cells and communicate information signals to at least one base station which has a receiver and is located in a first cell, using code division multiple access (CDMA) spread spectrum type communication signals.

26. The system of claim 20 wherein said means for providing electronic noise comprises means for producing noise with a relatively uniform spectral density over a predetermined bandwidth.

27. The system of claim 20 wherein said controller means comprises:

means for generating a random Gaussian control process indicative of signal transmission over a first set of simulated communication channels, said control process based on first and second Gaussian processes corresponding to an average data rate and an average power fluctuation of said signal transmission;

means for filtering said electronic noise in accordance with said random Gaussian control process; and means for transmitting said filtered electronic noise over said one communication channel.

28. The system of claim 27 wherein said controller means comprises:

means for generating a sequence of random variables, and means for scaling said sequence of random variables based on said average data rate.

29. The system of claim 28 wherein said controller means further comprises means for shifting said sequence of random variables based on a magnitude of said first composite signal energy.

30. The system of claim 20 wherein said controller means is configured to generate said noise intensity control signal using random Gaussian-controlled variables generated at preselected rates.

31. The system of claim 30 wherein said controller means comprises:

first means for generating a first binary sequence corresponding to a Gaussian random variable at one preselected rate; and means for filtering said first binary sequence based on an estimated correlation time of data signals transmitted over said at least one channel.

32. The system of claim 30 wherein said controller means comprises:

second means for generating a second binary sequence corresponding to a Gaussian random variable at second preselected rate; and means for filtering said second binary sequence based on estimated signal transmission by other base stations.

33. In a communication system in which information is transmitted over at least one communication channel, a system for simulating interference in said at least one communication channel comprising:

a source of electronic noise, said electrical noise having a relatively uniform spectral density over a predetermined bandwidth;

a controller for generating a first random Gaussian controlled process indicative of signal transmission over a first set of simulated communication channels, said control process being formed based upon first and second Gaussian processes corresponding to a first average data rate and a first average power fluctuation of said signal transmission;

a filter, coupled to said source of electronic noise, for filtering said electronic noise in accordance with first said random Gaussian control process; and a transmitter, coupled to said filter, for transmitting said filtered electronic noise over said one communication channel.

34. The system of claim 33 wherein said controller comprises:

a random variable generator for generating a sequence of random variables, and a scaling network for scaling said sequence of random variables based on said first average data rate.

35. The system of claim 33 wherein said controller further comprises a network for generating a second random Gaussian control process indicative of signal transmission over a second set of simulated communication channels, said second control process being formed based on third and fourth Gaussian processes corresponding to a second average data rate and a second average power fluctuation of said signal transmission over said second set of simulated communication channels.

36. Apparatus for simulating signal interference between communication channels in a communication system in which information signals are communicated between users over a plurality of communication channels, comprising:

means for determining a first composite signal energy corresponding to signals transmitted within said communication system over a first desired set of simulated channels;

means for determining a first normalized data rate for said signals transmitted over said first set of simulated channels; and means for generating a first interference signal with a signal energy based on said first composite signal energy and first normalized data rate.

37. The apparatus of claim 36 further comprising:

means for determining a second composite signal energy corresponding to a sum of signal energy for signals transmitted over a second set of simulated channels;

means for determining a second normalized data rate for said signals transmitted over said second set of simulated channels; and means for modifying said first interference signal in response to said second composite signal energy and second normalized data rate.

38. The apparatus of claim 36 wherein said means for determining a first composite signal energy comprises:

means for determining a number of real channels in use in said communication system;

means for determining an equivalent number of channels to be simulated by subtracting said number of real channels from said desired number of simulated channels in said first set;

means for determining a nominal first signal energy based on said equivalent number of channels; and means for producing variations in said nominal first signal energy using a random variable function.

39. Apparatus for simulating signal interference between communication channels in a communication system in which information signals are communicated between users over a plurality of communication channels, comprising:

an energy selector which outputs a first composite signal energy corresponding to a sum of signal energy for signals transmitted by a first set of a desired number of simulated channels disposed within said communication system;

a data rate generator configured to output a first normalized data rate for said signals transmitted by said first set of simulated channels; and a first interference signal generator coupled to said energy selector and said data rate generator which produces a signal with a signal energy based on said first composite signal energy and first normalized data rate.

40. The apparatus of claim 39 wherein said first interference signal generator comprises:

at least one electrical noise signal generator having an output energy intensity that is adjustable in response to a control signal input; and at least one noise intensity controller having a control signal output coupled to the control input of said noise source generator and inputs coupled to said energy selector and data rate generator, with said control signal having a value that varies in response to changes in said signal energy and data rate for simulated channels.

41. The apparatus of claim 40 further comprising at least a second energy selector which outputs a second composite signal energy corresponding to a sum of signal energy for signals transmitted over a second set of simulated channels disposed within said communication system, and said noise intensity controller is configured to also receive input from said second energy selector and base signal generation in part on said signal energy which is transmitted by said other simulated channels.

42. The apparatus of claim 40 wherein said noise intensity controller comprises:

first binary sequence generator producing a Gaussian random variable at one preselected rate; and first sequence filter connected to receive and filter said first binary sequence based on an estimated correlation time of data signals carried by said transmitted signal energy.

43. The apparatus of claim 40 wherein said noise intensity controller comprises:

second binary sequence generator producing a Gaussian random variable at second preselected rate; and second sequence filter connected to receive and filter said second binary sequence based on an average energy fluctuation.

44. The apparatus of claim 39 wherein said communication system is a cellular communication system in which users within a plurality of cells communicate information signals between one another using at least one base station included in a first of said cells and having a base station transmitter.

45. The apparatus of claim 39 wherein said communication system comprises a wireless telephone/data communication system in which users are located within a plurality of cells and communicate information signals to at least one base station which has a receiver and is located in a first cell, using code division multiple access (CDMA) spread spectrum type communication signals.

* * * * *